US012759625B2

(12) United States Patent
Kudo et al.

(10) Patent No.: US 12,759,625 B2
(45) Date of Patent: Oct. 13, 2026

(54) STEERING SYSTEM

(71) Applicant: TOYOTA JIDOSHA KABUSHIKI KAISHA, Aichi-ken (JP)

(72) Inventors: Yoshio Kudo, Machida (JP); Takahito Ishino, Numazu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 74 days.

(21) Appl. No.: 18/973,104

(22) Filed: Dec. 9, 2024

(65) Prior Publication Data

US 2025/0236334 A1 Jul. 24, 2025

(30) Foreign Application Priority Data

Jan. 18, 2024 (JP) ................................ 2024-006352

(51) Int. Cl.
*B62D 6/00* (2006.01)
*B62D 5/00* (2006.01)

(52) U.S. Cl.
CPC ............ *B62D 6/008* (2013.01); *B62D 5/006* (2013.01)

(58) Field of Classification Search
CPC ................................ B62D 6/008; B62D 5/006
USPC ............................................................ 701/41
See application file for complete search history.

(56) References Cited

U.S. PATENT DOCUMENTS 6,283,859 B1 * 9/2001 Carlson .................. G06F 3/016 463/36
10,351,162 B1 * 7/2019 Katzourakis .......... B62D 5/001
2001/0052893 A1 * 12/2001 Jolly .................... G06F 3/0338 345/156
2004/0056840 A1 * 3/2004 Goldenberg .......... B06B 1/0276 345/156
2004/0198522 A1 * 10/2004 Makuta .................. G09B 9/058 472/137
2007/0265077 A1 * 11/2007 Tom ........................ G06F 3/016 463/37
2009/0082077 A1 * 3/2009 Sugimori ............. A63F 13/245 463/40
2011/0256930 A1 * 10/2011 Jaouen .................. A63F 13/803 463/37

(Continued)

FOREIGN PATENT DOCUMENTS

JP 2022-001925 A 1/2022

*Primary Examiner* — Kurt Philip Liethen
*Assistant Examiner* — John D Bailey
(74) *Attorney, Agent, or Firm* — HAUPTMAN HAM, LLP

(57) ABSTRACT

A steering system includes: an operation device including an operation member and a reaction force application device; a turning device mechanically cut off from the operation device and configured to turn a wheel according to a control current; and a controller configured to control the turning device and the reaction force application device based on an operation signal relating to an action of the operation member. The steering system is configured to switch between a normal mode of turning the wheel based on the operation signal and a virtual mode of steering a virtual mobile body based on the operation signal. In the virtual mode, the controller sets the control current to a current value at which the wheel does not turn regardless of the operation signal, and sets the operation reaction force based on a predetermined oscillation component of a signal received from the turning device.

14 Claims, 4 Drawing Sheets

(56) References Cited

U.S. PATENT DOCUMENTS

2011/0281649 A1* 11/2011 Jaouen .................. A63F 13/803
463/36
2014/0222288 A1* 8/2014 Lavoie ............... B62D 15/0285
701/99
2015/0119145 A1* 4/2015 Jaouen .................. A63F 13/245
463/37
2015/0183460 A1* 7/2015 Oyama .................... B62D 6/00
701/41
2016/0137195 A1* 5/2016 Takahashi .............. G08G 1/166
701/41
2016/0152232 A1* 6/2016 Takahashi ........... B60T 8/17557
701/41
2016/0307953 A1* 10/2016 Kono ...................... B60R 11/04
2017/0064175 A1* 3/2017 Furutake .................. G02B 3/02
2017/0315556 A1* 11/2017 Mimura .............. B60W 50/082
2019/0276074 A1* 9/2019 Tietz ...................... B62D 5/006
2020/0269920 A1* 8/2020 Millsap ................. B60W 50/10
2020/0283059 A1* 9/2020 Kodera ................ B62D 5/0424
2020/0377152 A1* 12/2020 Taniguchi .............. B62D 5/046
2020/0391789 A1* 12/2020 Kim ..................... B62D 5/0421
2021/0009198 A1* 1/2021 Suzuki ................... B62D 5/006
2021/0064136 A1* 3/2021 Chassot ................ A63F 13/285
2021/0321205 A1* 10/2021 Akers ..................... A61F 11/00
2021/0339798 A1* 11/2021 Nakata .................... B60T 8/172
2022/0009546 A1* 1/2022 Mori ...................... B62D 5/049
2022/0009547 A1* 1/2022 Osajima ............... B62D 5/0463
2022/0081023 A1* 3/2022 Miyake ................ B62D 5/0463
2022/0097755 A1* 3/2022 Shibata ................ B62D 5/0409
2022/0097758 A1* 3/2022 Kasai ..................... B62D 6/008
2022/0227416 A1* 7/2022 Suzuki ................. B62D 15/025
2022/0253053 A1* 8/2022 Niwa .................. B60W 60/007
2022/0306189 A1* 9/2022 Ojima .................... B60K 35/22
2022/0402483 A1* 12/2022 Harai ....................... G08G 1/00
2023/0080186 A1* 3/2023 Hu ........................ A63F 13/245
446/456
2023/0182747 A1* 6/2023 Kobayashi ........ B60W 60/0059
701/1
2023/0415810 A1* 12/2023 Okazaki ................. B62D 6/001
2024/0095418 A1* 3/2024 Lopatine .................. G09B 9/05
2024/0184367 A1* 6/2024 Grenold Loy Dsa .. B25J 13/025
2025/0042428 A1* 2/2025 Yamaoka .......... B60W 60/0015

* cited by examiner

STEERING SYSTEM

CROSS-REFERENCE TO RELATED APPLICATION

This application claims priority to Japanese Patent Application No. 2024-006352 filed on Jan. 18, 2024, incorporated herein by reference in its entirety.

BACKGROUND

1. Technical Field

The present disclosure relates to a steering system.

2. Description of Related Art

Recently, among steering systems of steer-by-wire type in which an operation member and a turning device are mechanically cut off from each other, a steering system configured to allow a user to play a game using the operation member has been developed. For example, Japanese Unexamined Patent Application Publication No. 2022-1925 discloses a vehicle that can switch an operation target of an operation part of a steering device between the vehicle and a virtual mobile body in a game. That is, such a steering system is configured to be able to switch between a normal mode in which the vehicle is the operation target and a game mode in which the virtual mobile body is the operation target.

SUMMARY

A steering system of steer-by-wire type is configured such that when an operation member is operated by a user, a reaction force application device applies a reaction force (operation reaction force) to the operation member according to an action of the operation member. In the normal mode, the vehicle acquires information on a travel road surface, and the reaction force application device applies the operation reaction force to the operation member based on this road surface information. A detection value of a control current that is supplied to an electric motor of a turning device that turns wheels can vary according to the road surface conditions, as a turning load changes according to the road surface conditions. Therefore, the road surface conditions can be inferred by detecting the current value of the control current input into the electric motor. By using this inference, the reaction force application device can reflect the road surface conditions on the operation reaction force in the normal mode.

In the game mode, however, the magnitude of the control current of the electric motor of the turning device and the road surface conditions in the game do not correspond to each other. Further, in the game mode, since the vehicle is not actually traveling on a road surface, information on the road surface conditions cannot be acquired from the control current of the electric motor. In the game mode, therefore, an operation reaction force that does not reflect the road surface conditions is applied to the operation member. With the operation reaction force that does not reflect the road surface conditions, it is difficult to allow the user who operates the operation member to feel a high realistic sensation.

Thus, the conventional steering system has room for improvement in terms of improving the realistic sensation of the game. The present disclosure provides a steering system that can improve the realistic sensation given to the user when the operation member is used for a game.

A steering system of steer-by-wire type according to a first form of the present disclosure includes: an operation device including an operation member for a steering operation by a user and a reaction force application device configured to apply an operation reaction force to the operation member; a turning device mechanically cut off from the operation device and configured to turn a wheel according to a control current supplied; and a controller configured to control the turning device and the reaction force application device based on an operation signal relating to an action of the operation member received from the operation device. The steering system is configured to switch between a normal mode of turning the wheel based on the operation signal and a virtual mode of steering a virtual mobile body, created as a video image, based on the operation signal. In the virtual mode, the controller is configured to set the control current to a current value at which the wheel does not turn regardless of the operation signal, and set the operation reaction force based on a predetermined oscillation component of a signal received from the turning device.

In the steering system of the first form of the present disclosure, in the virtual mode, the controller may be configured to reflect the predetermined oscillation component on the operation reaction force that has been set based on the operation signal.

In the steering system of the first form of the present disclosure, the turning device may include an electric motor configured to turn the wheel and a current sensor configured to detect a current value of the control current input into the electric motor. In the virtual mode, the controller may be configured to extract a predetermined frequency component as the predetermined oscillation component from a signal relating to a detection value received from the current sensor.

The steering system of the first form of the present disclosure may further include a bandpass filter configured to pass only signals in a predetermined permitted frequency band, and an amplifier configured to amplify signals that have passed through the bandpass filter. The controller may be configured to set the operation reaction force using, as the predetermined oscillation component, a detection signal of the current sensor that has passed through the bandpass filter and the amplifier.

In the steering system of the first form of the present disclosure, each of the bandpass filter and the amplifier may be shared between the normal mode and the virtual mode. In the normal mode, the controller may be configured to set each of the predetermined permitted frequency band of the bandpass filter and a gain of the amplifier to a value for the normal mode. In the virtual mode, the controller may be configured to set each of the predetermined permitted frequency band of the bandpass filter and the gain of the amplifier to a value for the virtual mode.

In the steering system of the first form of the present disclosure, in the virtual mode, the controller may be configured to set the control current to zero regardless of the operation signal.

In the steering system of the first form of the present disclosure, in the virtual mode, the controller may be configured to supply the turning device with a corrected control current, obtained by adding an additional current value that increases and decreases at a predetermined frequency to the control current, such that the wheel turns left and right repeatedly regardless of the operation signal.

In the steering system of the first form of the present disclosure, the controller may be configured to receive an accelerator signal relating to an action of an accelerator operation member for an accelerator operation that is provided in a vehicle, and a brake signal relating to an action of a brake operation member for a brake operation that is provided in the vehicle. In the virtual mode, the controller may be configured to set the additional current value based on the accelerator signal or the brake signal.

In the steering system of the first form of the present disclosure, the controller may be configured to receive an accelerator signal relating to an action of an accelerator operation member for an accelerator operation that is provided in a vehicle, and a brake signal relating to an action of a brake operation member for a brake operation that is provided in the vehicle. In the virtual mode, the controller may be configured to set the operation reaction force based on the operation signal and the accelerator signal or based on the operation signal and the brake signal.

In the steering system of the first form of the present disclosure, in the virtual mode, the controller may be configured to reduce the operation reaction force according to the accelerator signal corresponding to forward movement of the virtual mobile body.

In the steering system of the first form of the present disclosure, in the virtual mode, the controller may be configured to increase the operation reaction force according to the brake signal during forward movement of the virtual mobile body.

A steering system of steer-by-wire type according to a second form of the present disclosure includes: an operation device including an operation member for a steering operation by a user and a reaction force application device configured to apply an operation reaction force to the operation member; a turning device mechanically cut off from the operation device and configured to turn a wheel according to a control current supplied; and a controller configured to control the turning device and the reaction force application device based on an operation signal relating to an action of the operation member received from the operation device. The steering system is configured to switch between a normal mode of turning the wheel based on the operation signal and a virtual mode of steering a virtual mobile body, created as a video image, based on the operation signal. In the virtual mode, the controller is configured to supply the turning device with the control current such that the wheel turns left and right repeatedly regardless of the operation signal.

In the steering system of the second form of the present disclosure, in the virtual mode, the controller may be configured to supply the turning device with the control current that increases and decreases at a predetermined frequency.

In the steering system of the second form of the present disclosure, the controller may be configured to receive an accelerator signal relating to an action of an accelerator operation member for an accelerator operation that is provided in a vehicle, and a brake signal relating to an action of a brake operation member for a brake operation that is provided in the vehicle. In the virtual mode, the controller may be configured to supply the turning device with the control current based on the accelerator signal or the brake signal such that the wheel turns left and right repeatedly.

A steering system of steer-by-wire type according to a third form of the present disclosure includes: an operation device including an operation member for a steering operation by a user and a reaction force application device configured to apply an operation reaction force to the operation member; a turning device mechanically cut off from the operation device and configured to turn a wheel according to a control current supplied; and a controller configured to control the turning device and the reaction force application device based on an operation signal relating to an action of the operation member received from the operation device. The steering system is configured to switch between a normal mode of turning the wheel based on the operation signal and a virtual mode of steering a virtual mobile body, created as a video image, based on the operation signal. The controller is configured to receive an accelerator signal relating to an action of an accelerator operation member for an accelerator operation that is provided in a vehicle, and a brake signal relating to an action of a brake operation member for a brake operation that is provided in the vehicle. In the virtual mode, the controller is configured to set the control current to a current value at which the wheel does not turn regardless of the operation signal, and set the operation reaction force based on the operation signal and the accelerator signal or based on the operation signal and the brake signal.

In the steering system of the third form of the present disclosure, in the virtual mode, the controller may be configured to reduce the operation reaction force according to the accelerator signal corresponding to forward movement of the virtual mobile 25 body.

In the steering system of the third form of the present disclosure, in the virtual mode, the controller may be configured to increase the operation reaction force according to the brake signal during forward movement of the virtual mobile body.

According to the first form of the present disclosure, in the virtual mode, the control current supplied to the turning device is set to a value (e.g., zero) at which the wheel does not turn. Thus, unnecessary turning of the wheel by an action of the operation member is avoided. Signals transmitted from the turning device (e.g., a detection signal of the control current) often include noise. The noise includes waves of a certain frequency, i.e., an oscillation component. As the controller reflects this oscillation component on the operation reaction force, the road surface conditions (roughness) can be simulatively conveyed to the user through the operation reaction force. Thus, according to the first form, the reality of the game increases and the realistic sensation given to the user in the game can be improved.

According to the second form of the present disclosure, in the virtual mode, the wheel can be made to vibrate left and right slightly regardless of the action of the operation member. Thus, pseudo-vibration resembling vibration of the vehicle during travel, for example, vibration of an engine or vibration due to irregularities of the road surface can be generated in the vehicle. According to the second form, the reality of the game increases and the realistic sensation given to the user in the game can be improved.

According to the third form of the present disclosure, the influence of an accelerator operation or a brake operation on the wheel can be reflected on the operation reaction force. For example, when an accelerator operation or a brake operation is performed, a pitch angle of the vehicle changes and a force (load) exerted on the wheel also changes. In a configuration in which the operation member and the turning device are mechanically connected to each other, when a force exerted on turning wheels changes, an operation feel (steering force) of the operation member also changes. According to the third form, a change in the operation feel due to a change in the force exerted on the wheel can be represented by the operation reaction force. Thus, according to the third form, the reality of the game increases and the realistic sensation given to the user in the game can be improved.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

As a form of implementing the present disclosure, a steering system 1 that is one embodiment of the present disclosure will be specifically described with reference to the drawings. The present disclosure can be implemented in various forms other than the following example of implementation, with various changes and improvements made based on the knowledge of those skilled in the art. The steering system 1 of this embodiment is installed in a battery electric vehicle as one example. Communication inside the vehicle is performed by, for example, a controller area network (CAN), FlexRay, or Ethernet.

Figure 1:
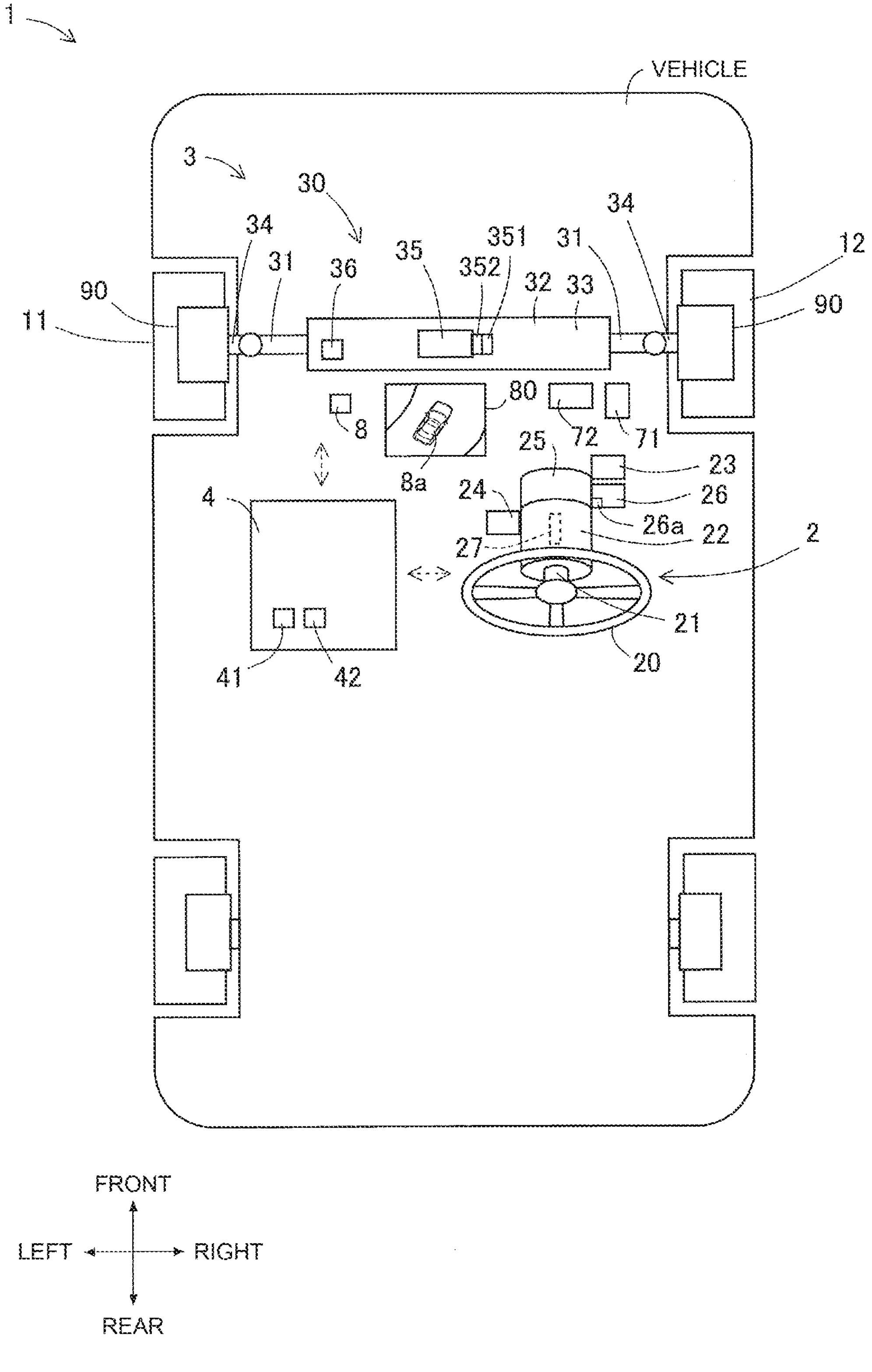
FIG. 1 is a configuration diagram of a steering system of an embodiment.

As shown in FIG. 1, the steering system 1 includes an operation device 2, a turning device 3, and a controller 4. The operation device 2 of this embodiment includes an operation member 20, a steering shaft 21, a steering column 22, an operation amount sensor 23, an operation torque sensor 24, and a reaction force application device 25.

The operation member 20 is a handle member for a steering operation by a user. The operation member 20 is, for example, a steering wheel. The shape of the operation member 20 is not limited to a circular shape like a steering wheel, and may be, for example, a polygonal shape, such as a quadrangular shape. The operation member 20 can also be called a steering operation member. The operation member 20 is fixed at a leading end of the steering shaft 21. The operation member 20 and the steering shaft 21 are rotatably held on an instrument panel reinforcement by the steering column 22.

The operation amount sensor 23 is a sensor that detects an operation amount (operation angle) of the operation member 20. The operation torque sensor 24 is a sensor that detects an operation torque of the operation member 20. The operation torque can also be called an operation force that the user has exerted on the operation member 20. The operation torque sensor 24 detects, for example, an amount of twisting of a torsion bar 27 that is incorporated in the steering shaft 21.

The reaction force application device 25 is a device that applies an operation reaction force to the operation member 20. The reaction force application device 25 includes a reaction force motor 26 that is an electric motor. Using the reaction force motor 26 supported on the steering column 22 as a power source, the reaction force application device 25 applies the operation reaction force in response to a steering operation to the operation member 20 through the steering shaft 21. The reaction force application device 25 is one with an ordinary structure including a speed reducer etc. On the reaction force motor 26, a rotation angle sensor **26*a*** is provided.

The turning device 3 is a device that turns wheels 11, 12 (front wheels or turning wheels). The turning device 3 is mechanically cut off from the operation device 2. The turning device 3 includes a turning motor 35 that is an electric motor as a driving source, and a current sensor 351 that detects a current value of a control current input into the turning motor 35. In more detail, the turning device 3 includes a steering rod 31, a housing 32, a rod moving mechanism 33, a turning motor 35, the current sensor 351, a rotation angle sensor 352, and a turning angle sensor 36.

The steering rod 31 is a member that is coupled at both ends respectively to left and right steering knuckles 90 through tie rods 34. The housing 32 is a member that supports the steering rod 31 so as to be able to move left and right and is fixedly held on a vehicle body.

The rod moving mechanism 33 is a mechanism for moving the steering rod 31 left and right using the turning motor 35 as a driving source. The turning motor 35 is an electric motor that turns the wheels 11, 12. The rod moving mechanism 33 is mainly formed by a ball screw mechanism composed of a ball groove that is spirally provided in the steering rod 31, and a nut that engages with the ball groove through bearing balls and is rotated by the turning motor 35. The rod moving mechanism 33 is one with an ordinary structure and therefore detailed description thereof will be omitted.

The current sensor 351 is a sensor that detects a current (control current) input into the turning motor 35. The rotation angle sensor 352 is a sensor that detects a rotation angle of the turning motor 35. The turning angle sensor 36 is a sensor that detects a turning angle (turning amount) of the wheels 11, 12. The turning angle sensor 36 detects an amount of movement of the steering rod 31 each of leftward and rightward from a neutral position.

The controller 4 is configured to control the turning device 3 and the reaction force application device 25 based on an operation signal relating to an action of the operation member 20 received from the operation device 2. The controller 4 is a computer including one or more processors 41 and one or more memories 42. The computer can also be called an electronic control unit (ECU). The controller 4 is communicably connected to the operation device 2 and the turning device 3. The operation device 2 and the turning device 3 are electrically connected to each other through the controller. Thus, the steering system 1 is a steering system of steer-by-wire type that steers the vehicle by converting a mechanical action of the operation member 20 performed by the user into an electrical signal and transmitting the electrical signal to the turning device 3 that is mechanically cut off from the operation member 20. The controller 4 may be composed of two or more computers that are communicably connected to each other. For example, the controller 4 may be composed of a controller (computer) of the operation device 2 and a controller (computer) of the turning device 3.

Control Modes

The steering system 1 is configured to be able to switch between a normal mode of turning the wheels 11, 12 based on the operation signal and a virtual mode of steering a virtual mobile body 8*a*, created as a video image, based on the operation signal. Thus, in the steering system 1, at least two control modes are set. The normal mode is a control mode for steering the vehicle based on an action of the operation member 20. The virtual mode is a control mode in which, for example, the virtual mobile body 8*a* represented by a video image (e.g., a video image of the vehicle) in a game is operated by the operation member 20. The virtual mobile body 8*a* is created as a video image that is visible and audible inside the vehicle. The normal mode can also be called, for example, a first mode, a main mode, or a real mode. The virtual mode can also be called, for example, a second mode, a sub-mode, or a game mode.

Inside the vehicle, a display device 80 is disposed. Examples of the display device 80 include a display of an instrument panel, a display of a navigation system, a windshield on which an image etc. are projected, a display of a mobile terminal, AR glasses, and a head-mounted display. A game machine 8 may be disposed inside the vehicle, or may be disposed outside the vehicle by being connected to the vehicle through wireless communication. The game machine 8 can be called a computer including one or more processors and one or more memories. The game machine 8 and the controller 4 are connected to each other so as to be able to communicate only predetermined information.

In the virtual mode, the game machine 8 displays the virtual mobile body 8*a* on the display device 80. The controller 4 transmits operation information that can be read from the operation signal to the game machine 8, and based on the operation information, the game machine 8 creates a display image of the virtual mobile body 8*a* on the display device 80 and displays a situation where the virtual mobile body 8*a* is steered on the display device 80. Thus, in the virtual mode, the user can steer the virtual mobile body 8*a* displayed on the display device 80 by operating the operation member 20.

The controller 4 switches between the normal mode and the virtual mode based on the user's operation (instructions). For example, when the user performs a button operation of selecting the virtual mode on mode selection means (e.g., an operation panel) provided in the vehicle, the controller 4 switches the control mode of the vehicle from the normal mode to the virtual mode after confirming that predetermined conditions are met. Similarly, based on the user's operation of the operation panel etc., the controller 4 switches the control mode from the virtual mode to the normal mode. When the user selects the virtual mode and the predetermined conditions are met, the controller 4 turns a change permission flag on. When the user does not select the virtual mode or when the predetermined conditions are not met, the change permission flag is maintained as being off. The virtual mode is a control mode based on an assumption that the user plays a game using the operation member 20 while the vehicle is in a stationary state, for example, during charging of a battery of the battery electric vehicle.

Details of Normal Mode

In the normal mode, the controller 4 controls the turning motor 35 based on a detection value (detection signal) of the operation amount sensor 23. The controller 4 calculates a target turning angle from the detection value of the operation amount sensor 23, and sets a current value of the control current based on a difference between the target turning angle and an actual turning angle (a detection value of the turning angle sensor 36). The controller 4 supplies the set control current to the turning motor 35.

In the normal mode, the controller 4 controls the reaction force motor 26 by setting the operation reaction force for the operation member 20 based on detection values of the operation amount sensor 23 and the operation torque sensor 24. The controller 4 supplies the reaction force motor 26 with a current (which can also be called a reaction force current) according to the set operation reaction force.

The controller 4 calculates a rate of lateral acceleration of the vehicle based on a vehicle speed and the detection value of the turning angle sensor 36. The vehicle speed is calculated based on, for example, detection values of wheel speed sensors (not shown) that are provided on the respective wheels. The controller 4 calculates a self-aligning torque of the wheels based on the detection value of the turning angle sensor 36. The controller 4 can also be said to estimate a force equivalent to the self-aligning torque based on the turning angles of the wheels. Various forces acting on the wheels can vary according to the vehicle speed. In the normal mode, therefore, the controller 4 reflects, for example, the vehicle speed, the rate of lateral acceleration, and the self-aligning torque on the operation reaction force. In the controller 4, an operation reaction force equivalent to resistance of a road surface to turning of the wheels is also set as a basic reaction force.

The controller 4 sets the operation reaction force based on the detection value of the operation torque sensor 24. Keeping the user's operation torque within a predetermined range requires a force that assists the user's operation of the operation member 20 according to the magnitude of the operation torque. Therefore, the controller 4 makes the operation reaction force smaller as the detection value of the operation torque sensor 24 becomes larger such that the operation torque is maintained within the predetermined range. Hereinafter, reaction force control based on the operation amount and the operation torque of the operation member 20, i.e., reaction force control taking into account, for example, the self-aligning torque and an assisting force will also be referred to as "first reaction force control".

The control current is set according to the difference between the target turning angle and the actual turning angle (hereinafter also called an angle difference). The control current can also be called a turning current or a turning command value. When the controller 4 supplies the turning motor 35 with the control current corresponding to the angle difference but the angle difference does not become small due to road surface conditions (e.g., irregularities), the controller 4 further increases the control current to thereby increase the driving force of the turning motor 35. Depending on the road surface conditions, a case occurs where only the control current varies while the angle difference does not vary. That is, variations in the control current are sometimes attributable to the road surface conditions. The controller 4 can convey the road surface conditions to the user by detecting such variations in the control current and reflecting these variations in the control current on the operation reaction force. Hereinafter, reaction force control based on variations in the control current, i.e., reaction force control taking into account, for example, the road surface conditions (road noise) will also be referred to as "second reaction force control".

Thus, in the normal mode, the controller 4 sets the operation reaction force for the operation member 20 so as to simulate, for example, a steering system of power steering type in which the operation member 20 and the turning device 3 are mechanically connected to each other (hereinafter also called a mechanically connected system). In the normal mode, the controller 4 executes, for the reaction force application device 25, the first reaction force control, the second reaction force control, and reaction force control taking into account the vehicle speed and the rate of lateral acceleration (hereinafter also called third reaction force control). The self-aligning torque is a force that acts in a direction of reducing a slip angle of tires, and is, in the mechanically connected system, a force that tries to move the operation member 20 that has been operated to its original position. For example, until the turning angle of the wheels 11, 12 reaches a predetermined angle, the self-aligning torque increases as the turning angle increases. For example, until the turning angle reaches the predetermined angle, the controller 4 increases the operation reaction force as the turning angle increases.

Details of Virtual Mode

In the virtual mode, the controller 4 sets the control current to a current value at which the wheels 11, 12 do not turn regardless of the operation signal (regardless of the action of the operation member 20). This control is also called "turning prevention control". The controller 4 can also be said to set the absolute value of the control current to be equal to or smaller than a predetermined value. As one example of the turning prevention control, in the virtual mode, the controller 4 sets the control current to zero regardless of the operation signal. Thus, in the virtual mode, the controller 4 is configured, in principle, not to supply the control current to the turning motor 35. Therefore, the turning motor 35 does not operate and the wheels 11, 12 are not turned. The current value of the control current at which the wheels 11, 12 do not turn can be calculated beforehand through an experiment, a simulation, etc., for example, by assuming travel on a general paved road or unpaved road.

In the virtual mode, the controller 4 sets the operation reaction force based on the operation signal. The operation signal is a signal relating to the detection value of the operation amount sensor 23 and/or the detection value of the operation torque sensor 24. That is, in the virtual mode, the controller 4 executes the first reaction force control for the reaction force application device 25. For example, the controller 4 calculates the self-aligning torque based on the detection value of the operation amount sensor 23, and reflects the calculated self-aligning torque on the operation reaction force. Thus, the operation reaction force becomes larger as the self-aligning torque becomes larger.

(1) Road Surface Simulation Control in Virtual Mode

In the virtual mode, unlike in the normal mode, the vehicle does not actually travel on a road surface. Therefore, the road surface conditions do not vary and variations in the control current according to the road surface conditions do not occur. Thus, in the virtual mode, the controller 4 cannot execute the second reaction force control and the third reaction force control as in the normal mode.

Such being the case, the controller 4 is configured to set the operation reaction force based on a predetermined oscillation component of a signal received from the turning device 3. The controller 4 of this embodiment is configured to reflect the predetermined oscillation component of the signal received from the turning device 3 on the operation reaction force set based on the operation signal, i.e., the operation reaction force set in the first reaction force control.

Hereinafter, control that reflects the predetermined oscillation component of the signal from the turning device 3 on the set operation reaction force will also be referred to as "road surface simulation control". While various signals are conceivable as the signal that the controller 4 receives from the turning device 3, in this embodiment, the signal is the detection value (detection signal) of the current sensor 351. The oscillation component can be called a part where the value indicated by the signal fluctuates at a certain frequency (in a wave form) in time-series data on the magnitude of the value.

The detection value of the current sensor 351 includes a random noise component. In this embodiment, the control current equivalent to the turning command value from the controller 4 to the turning motor 35 is set to zero. In a circuit inside the turning device 3, however, noise has entered due to its configuration, and the detection value of the current sensor 351 is not the set value (zero) but varies a little. The controller 4 uses these fine variations in the detection value, i.e., the noise component, of the current sensor 351 as the oscillation component for the reaction force control.

Figure 2:
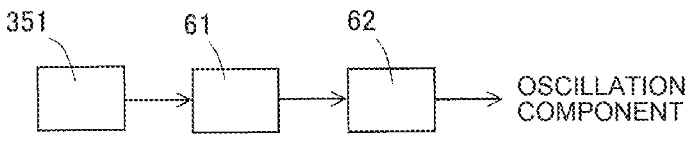
FIG. 2 is a configuration diagram for describing road surface simulation control of the embodiment.

In the virtual mode, the controller 4 is configured to extract a predetermined frequency component as the oscillation component from the signal relating to the detection value received from the current sensor 351. As shown in FIG. 2, the detection signal of the current sensor 351 is extracted as the predetermined oscillation component by passing through a bandpass filter 61 and an amplifier 62. The controller 4 reflects the signal extracted from the detection signal of the current sensor 351 by the bandpass filter 61 and the amplifier 62 on the operation reaction force as the oscillation component. That is, the controller 4 varies the operation reaction force set in the first reaction force control based on the oscillation component and according to passage of time. The controller 4 re-sets the operation reaction force by adding the value of the oscillation component at that time to the operation reaction force set in the first reaction force control. The controller 4 controls the reaction force motor 26 based on the re-set operation reaction force (reaction force current).

The bandpass filter 61 is a filter circuit that passes only signals in a predetermined frequency band (hereinafter also called a permitted frequency band). The bandpass filter 61 is configured such that the permitted frequency band is adjustable. The controller 4 changes the permitted frequency band of the bandpass filter 61 according to the control mode such that the permitted frequency band differs between the normal mode and the virtual mode. In the controller 4, the permitted frequency band for the normal mode and the permitted frequency band for the virtual mode are stored.

The amplifier 62 is a circuit that amplifies the magnitude of the signal, and amplifies the input signal according to a set gain and outputs the amplified signal. The controller 4 adjusts the gain of the amplifier 62 according to the control mode such that the gain differs between the normal mode and the virtual mode. In the controller 4, a gain for the normal mode and a gain for the virtual mode are stored. Thus, the controller 4 switches parameter values relating to the signal to be extracted (oscillation component) according to the control mode. Each of the bandpass filter 61 and the amplifier 62 is shared between the normal mode and the virtual mode.

Figure 3:
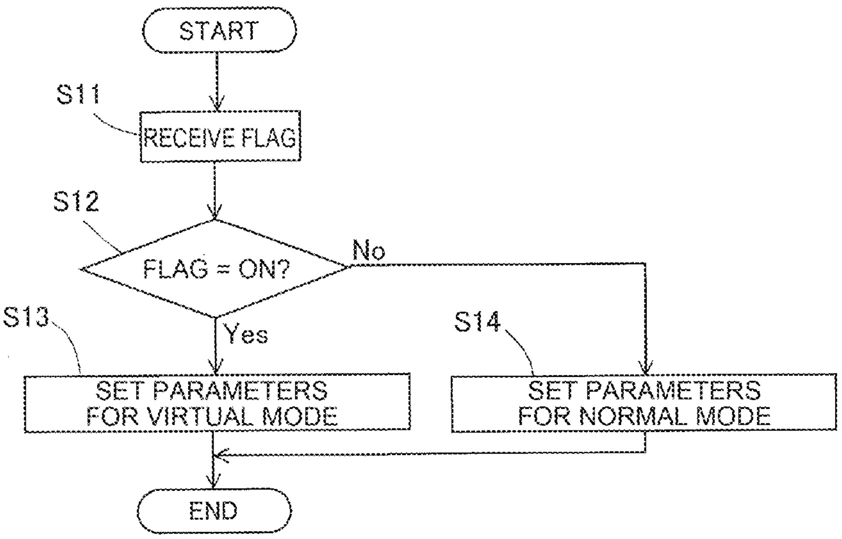
FIG. 3 is a flowchart showing one example of the road surface simulation control of the embodiment.

As one example of the control, as shown in FIG. 3, the controller 4 receives a change permission flag at a predetermined timing (S11). The predetermined timing may be, for example, a periodic one, or may be after an operation for changing from the normal mode to the virtual mode is performed by the user. When the change permission flag is on (S12: Yes), the controller 4 sets the control mode to the virtual mode. Specifically, the controller 4 sets the control current corresponding to the turning command value to zero, sets the permitted frequency band of the bandpass filter 61 to the value for the virtual mode, and sets the gain of the amplifier 62 to the value for the virtual mode (S13).

When the change permission flag is off (S12: No), the controller 4 sets the control mode to the normal mode. Specifically, the controller 4 sets the control current according to the operation signal, sets the permitted frequency band of the bandpass filter 61 to the value for the normal mode, and sets the gain of the amplifier 62 to the value for the normal mode (S14).

According to the above-described configuration, in the virtual mode, the control current is set to a current value (here, zero) at which the wheels 11, 12 do not turn by the turning prevention control. Thus, unnecessary turning of the wheels 11, 12 by an action of the operation member 20 is avoided. As a result, deterioration of the tires and an increase in power consumption are avoided. Signals transmitted from the turning device 3 (e.g., the detection value of the control current) often include noise. The noise includes waves of a certain frequency, i.e., an oscillation component. As the controller 4 reflects this oscillation component on the operation reaction force, the road surface conditions (roughness) can be simulatively conveyed to the user through the operation reaction force. Thus, according to the road surface simulation control, the reality of the game increases and the realistic sensation given to the user in the game can be improved.

In executing the road surface simulation control, the controller 4 can use components that are used in the normal mode (e.g., the bandpass filter 61 and the amplifier 62). Thus, an increase in the manufacturing cost can be avoided, and efficient utilization of the components becomes possible. The steering system 1 described above is configured to use the same bandpass filter 61 and the same amplifier 62 in the normal mode and the virtual mode. On the other hand, the steering system 1 may include, for example, a normal route including a bandpass filter and an amplifier for the normal mode and a virtual route including a bandpass filter and an amplifier for the virtual mode. In this case, the controller 4 selects the route for signals to pass through according to the control mode.

The controller 4 may execute the road surface simulation control not for the operation reaction force set in the first reaction force control but for an operation reaction force set by another method. In the normal mode, the controller 4 executes the first reaction force control, the second reaction force control, and the third reaction force control. In the virtual mode, the controller 4 executes, for example, the turning prevention control, the first reaction force control, and the road surface simulation control.

(2) Vehicle Vibration Control in Virtual Mode

In the virtual mode, the controller 4 may supply the control current to the turning device 3 such that the wheels 11, 12 turn left and right repeatedly regardless of the operation signal (regardless of the action of the operation member 20). This control is also referred to as "vehicle vibration control." When the vehicle vibration control is executed, as in the turning prevention control, the association between the operation signal and the control current becomes lost and the control current is set such that the wheels 11, 12 perform a predetermined action. According to the vehicle vibration control, the wheels 11, 12 can be made to vibrate left and right slightly in the virtual mode. Thus, pseudo-vibration resembling vibration of the vehicle during travel, for example, vibration of an engine or vibration due to irregularities of the road surface, can be generated in the vehicle. According to this configuration, the reality of the game increases and the realistic sensation given to the user in the game can be improved.

In the virtual mode, the controller 4 is configured to supply the control current that increases and decreases at a predetermined frequency to the turning device 3 (turning motor 35). For example, the controller 4 executes the vehicle vibration control while executing the first reaction force control.

Figure 4:
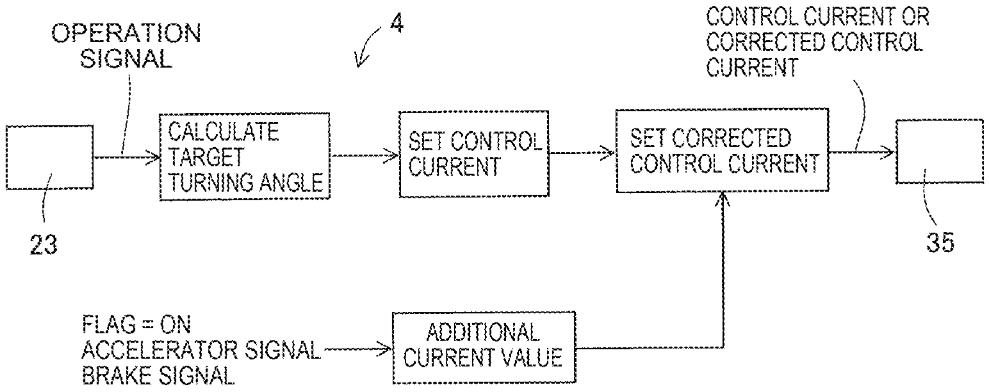
FIG. 4 is a configuration diagram for describing vehicle vibration control of the embodiment.

When executing the vehicle vibration control while executing the turning prevention control, the controller 4 supplies the turning device 3 with a corrected control current, obtained by adding an additional current value that increases and decreases at a predetermined frequency to the control current set in the turning prevention control, such that the wheels 11, 12 turn left and right repeatedly regardless of the operation signal. As shown in FIG. 4, in the normal mode, the target turning angle is calculated from the operation signal, and the turning command value (the current value of the control current) is set from the difference between the target turning angle and the actual turning angle. In the turning prevention control of the virtual mode, the current value of the control current that is this turning command value is set to zero. In the vehicle vibration control of the virtual mode, the additional current value that increases and decreases at a predetermined frequency is added to the current value of the control current that has been set as the turning command value. Thus, the current value of the corrected control current that makes the wheels 11, 12 swing left and right is set, and the corrected control current is supplied to the turning motor 35.

Figure 5:
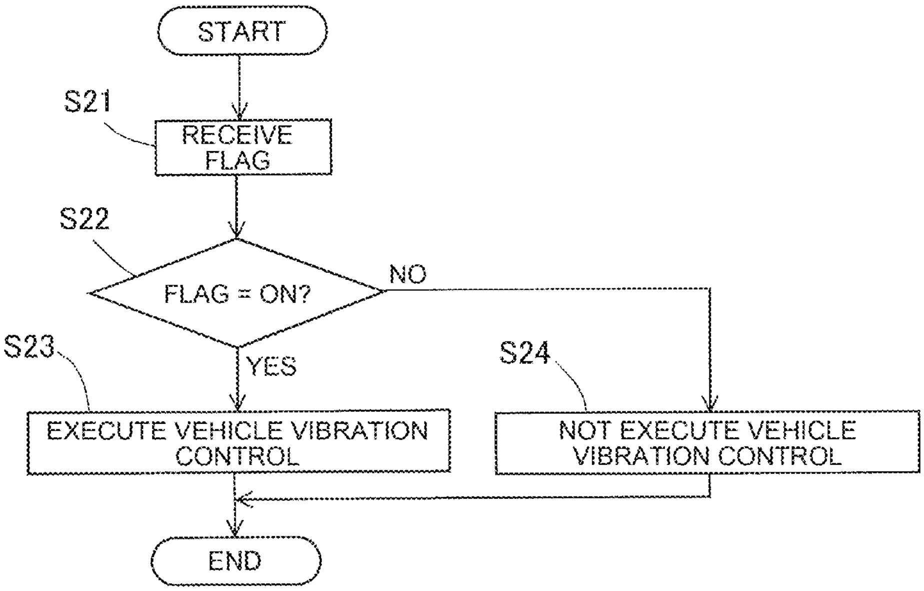
FIG. 5 is a flowchart showing one example of the vehicle vibration control of the embodiment.

As one example of the control, as shown in FIG. 5, the controller 4 receives the change permission flag at a predetermined timing (S21). When the change permission flag is on (S22: Yes), the controller 4 sets the control mode to the virtual mode and executes the vehicle vibration control (S23). When the change permission flag is off (S22: No), the controller 4 sets the control mode to the normal mode and does not execute the vehicle vibration control (S24).

The controller 4 may be configured to execute the vehicle vibration control only at a predetermined vibration timing. Examples of the vibration timing include, in the virtual mode, a timing when the game actually starts, a timing when the virtual mobile body 8*a* is displayed on the display device 80, a timing when an accelerator operation member 71 is operated, and a timing when a brake operation member 72 is operated.

The controller 4 is configured to receive an accelerator signal relating to an action of the accelerator operation member 71 for an accelerator operation that is provided in the vehicle, and a brake signal relating to an action of the brake operation member 72 for a brake operation that is provided in the vehicle. The accelerator signal is equivalent to, for example, a detection value of a sensor (not shown) that detects an operation amount of the accelerator operation member 71. The brake signal is equivalent to, for example, a detection value of a sensor (not shown) that detects an operation amount of the brake operation member 72. In the virtual mode, the controller 4 may be configured to set the additional current value based on the accelerator signal or the brake signal. Thus, the degree of vibration of the vehicle can be changed according to the extent of the accelerator operation or the extent of the brake operation by the user.

The controller 4 may increase the additional current value according to the accelerator signal or the brake signal. The controller 4 may change the frequency of the additional current value according to the accelerator signal or the brake signal. The controller 4 may set the additional current value to zero when an accelerator operation or a brake operation is not performed. The accelerator operation member 71 is, for example, an accelerator pedal, and the brake operation member 72 is, for example, a brake pedal. The accelerator operation member 71 and the brake operation member 72 may be members provided in the operation member 20 (e.g., lever members or paddle members).

In the virtual mode, the controller 4 executes, for example, the turning prevention control, the first reaction force control, and the vehicle vibration control. In addition, the controller 4 may further execute the road surface simulation control in the virtual mode.

(3) Pitch Reflection Control in Virtual Mode

In the virtual mode, the controller 4 may be configured to set the operation reaction force based on the operation signal and the accelerator signal or based on the operation signal and the brake signal. Control that sets the operation reaction force based on the accelerator signal or the brake signal is also called "pitch reflection control". As the accelerator operation and the brake operation by the user are reflected on the operation reaction force in the virtual mode, the reality of the game increases and the realistic sensation improves.

According to this configuration, the influence of the accelerator operation or the brake operation on the wheels 11, 12 can be reflected on the operation reaction force. For example, when an accelerator operation or a brake operation is performed, a pitch angle of the vehicle changes and a downward force (load) exerted on the wheels 11, 12 also changes. In the mechanically connected system, when the load changes, an operation feel of the operation member 20 also changes. According to this configuration, a change in the operation feel due to a change in the load can be represented by the operation reaction force. The controller 4 can execute the pitch reflection control along with the turning prevention control, the road surface simulation control, and the vehicle vibration control.

In the virtual mode, the controller 4 is configured to reduce the operation reaction force according to an accelerator signal corresponding to forward movement of the virtual mobile body 8*a*. When the vehicle moves forward by an accelerator operation, the pitch angle of the vehicle changes to a nose-up angle and the downward force exerted on the wheels 11, 12 decreases. In this situation, in the mechanically connected system, the resistance of the road surface to turning of the wheels 11, 12 decreases, so that the force required to operate the operation member 20 decreases. To represent this situation by the operation reaction force, the controller 4 reduces the operation reaction force according to the accelerator signal for forward movement.

In the virtual mode, the controller 4 is configured to increase the operation reaction force according to a brake signal during forward movement of the virtual mobile body 8*a*. When a brake operation is performed while the vehicle is moving forward, the pitch angle of the vehicle changes to a nose-down angle and the downward force exerted on the wheels 11, 12 increases. In this situation, in the mechanically connected system, the resistance of the road surface to turning of the wheels 11, 12 increases, so that the force required to operate the operation member 20 increases. To represent this situation by the operation reaction force, the controller 4 increases the operation reaction force according to the brake signal during forward movement.

The controller 4 executes a front-wheel load calculation of estimating a front-wheel load based on the accelerator signal or the brake signal. The controller 4 reflects a calculation result of the front-wheel load calculation on the operation reaction force set by the first reaction force control. For example, the controller 4 increases the operation reaction force as the front-wheel load increases, and reduces the operation reaction force as the front-wheel load decreases.

In the game, the virtual mobile body 8*a* is in most cases configured to move forward by an accelerator operation. In the virtual mode, therefore, the controller 4 may execute the above-described reaction force control by regarding the accelerator signal as forward acceleration of the virtual mobile body 8*a* and the brake signal as deceleration of the virtual mobile body 8*a* during forward movement. Thus, the controller 4 need not determine whether movement is forward or not, or whether it is during forward movement or not.

In the virtual mode, the controller 4 executes the turning prevention control, the first reaction force control, and the pitch reflection control. In addition, the controller 4 may execute the road surface simulation control and/or the vehicle vibration control in the virtual mode.

The pitch reflection control may be executed also in the normal mode. In this case, the controller 4 may switch a gain of the front-wheel load calculation between a gain for the normal mode and a gain for the virtual mode according to the control mode. For example, as the gain becomes larger, the range of variation in the calculation result (front-wheel load) in the front-wheel load calculation becomes wider.

Figure 6:
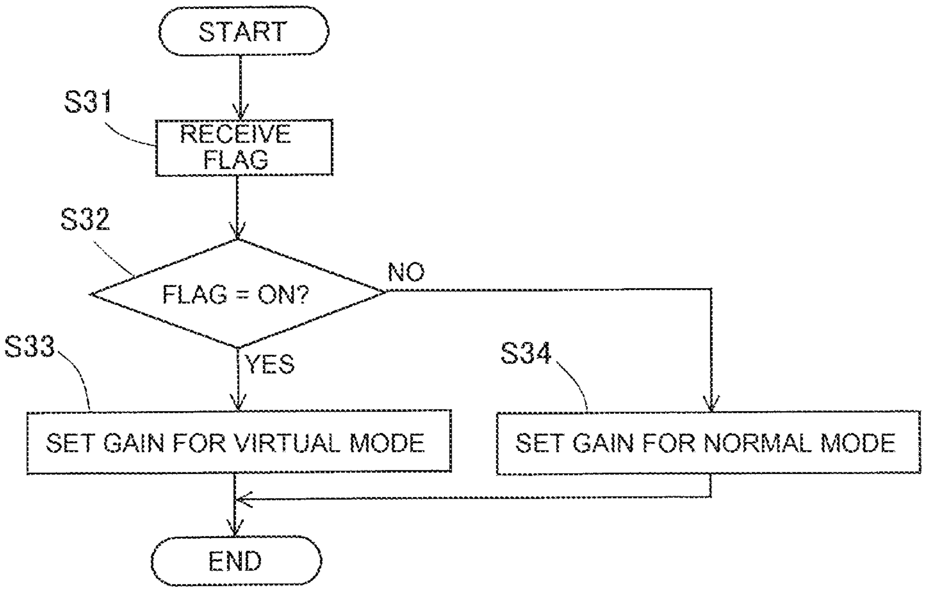
FIG. 6 is a flowchart showing one example of pitch reflection control of the embodiment.

As one example of the control, as shown in FIG. 6, the controller 4 receives the change permission flag at a predetermined timing (S31). When the change permission flag is on (S32: Yes), the controller 4 sets the control mode to the virtual mode, changes the gain of the front-wheel load calculation to the value for the virtual mode, and executes, for example, the first reaction force control and the pitch reflection control (S33). When the change permission flag is off (S32: No), the controller 4 sets the control mode to the normal mode, changes the gain of the front-wheel load calculation to the value for the normal mode, and executes, for example, the first reaction force control, the second reaction force control, the third reaction force control, and the pitch reflection control (S34). The gain of the front-wheel load calculation may be changed according to the accelerator operation amount or the brake operation amount.

Recapitulation

Figure 7:
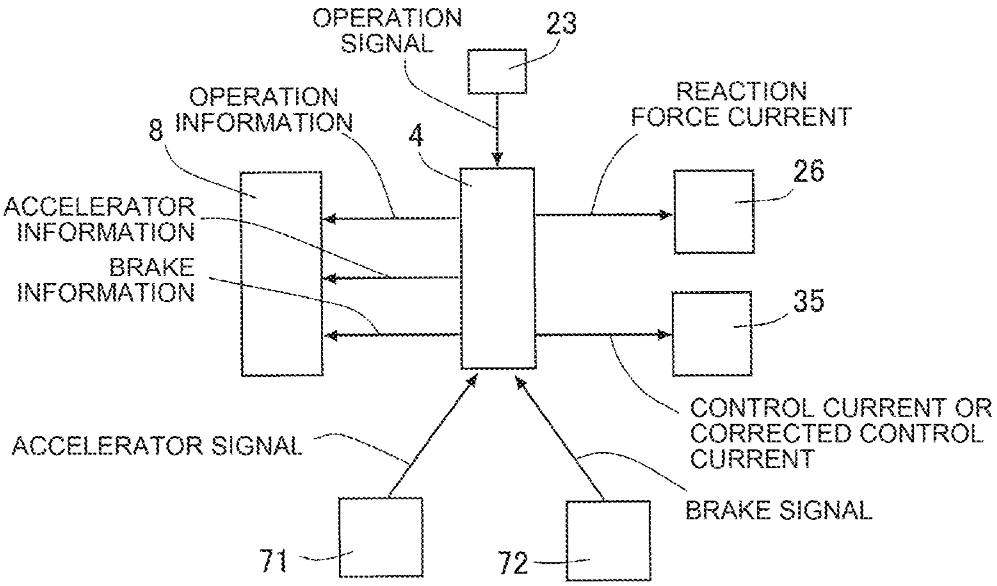
FIG. 7 is a conceptual view showing flows of signals in the steering system of the embodiment.

As shown in FIG. 7, in the virtual mode, the controller 4 transmits operation information relating to the operation amount of the operation member 20, accelerator information relating to the operation amount of the accelerator operation member 71, and brake information relating to the operation amount of the brake operation member 72 to the game machine 8 based on the operation signal, the accelerator signal, and the brake signal that have been input. The game machine 8 displays the virtual mobile body 8*a* on the display device 80 so as to reflect the aforementioned various pieces of information received from the controller 4. In each of the control modes, the controller 4 sets the operation reaction force based on the aforementioned various signals that have been input, and supplies the reaction force current corresponding to the operation reaction force to the reaction force motor 26. In the steering system 1, the setting of the operation reaction force differs according to the control mode as described above. In each of the control modes, the controller 4 sets the control current or the corrected control current based on the aforementioned various signals that have been input, and supplies the control current or the corrected control current to the turning motor 35. In the steering system 1, the setting of the control current or the corrected control current differs according to the control mode as described above.

In the virtual mode, the controller 4 can execute, for example, the first reaction force control, the turning prevention control, the road surface simulation control, the vehicle vibration control, and the pitch reflection control all at the same time or each independently. Thus, the various controls in this disclosure can be combined with one another as appropriate. The steering system 1 of this embodiment includes at least one of the following: (1) a configuration in which the turning prevention control and the road surface simulation control are executed in the virtual mode, (2) a configuration in which the vehicle vibration control is executed in the virtual mode, and (3) a configuration in which the turning prevention control, the first reaction force control, and the pitch reflection control are executed in the virtual mode. When information on speed of the virtual mobile body 8*a* in the game can be acquired from the game machine 8, the controller 4 may set the operation reaction force, i.e., execute the third reaction force control, based on this vehicle speed information. The game machine 8 may function as, for example, a simulator for driving training. The technology of this disclosure can also be applied to mobile bodies other than battery electric vehicles. The game machine 8 and the CAN (and/or the controller 4) can communicate predetermined information to each other.

What is claimed is:

1. A steering system of steer-by-wire type, comprising:

an operation device including an operation member for a steering operation by a user and a reaction force application device configured to apply an operation reaction force to the operation member;

a turning device mechanically cut off from the operation device and configured to turn a wheel according to a control current supplied; and a controller configured to control the turning device and the reaction force application device based on an operation signal relating to an action of the operation member received from the operation device, wherein:

the steering system is configured to switch between a normal mode of turning the wheel based on the operation signal and a virtual mode of steering a virtual mobile body, created as a video image, based on the operation signal; and in the virtual mode, the controller is configured to set the control current to a current value at which the wheel does not turn regardless of the operation signal, and set the operation reaction force based on a predetermined oscillation component of a signal received from the turning device.

2. The steering system according to claim 1, wherein:

the turning device includes an electric motor configured to turn the wheel and a current sensor configured to detect a current value of the control current input into the electric motor; and in the virtual mode, the controller is configured to extract a predetermined frequency component as the predetermined oscillation component from a signal relating to a detection value received from the current sensor.

3. The steering system according to claim 2, further comprising:

a bandpass filter configured to pass only signals in a predetermined permitted frequency band; and an amplifier configured to amplify signals that have passed through the bandpass filter, wherein the controller is configured to set the operation reaction force using, as the predetermined oscillation component, a detection signal of the current sensor that has passed through the bandpass filter and the amplifier.

4. The steering system according to claim 3, wherein:

each of the bandpass filter and the amplifier is shared between the normal mode and the virtual mode;

in the normal mode, the controller is configured to set each of the predetermined permitted frequency band of the bandpass filter and a gain of the amplifier to a value for the normal mode; and in the virtual mode, the controller is configured to set each of the predetermined permitted frequency band of the bandpass filter and the gain of the amplifier to a value for the virtual mode.

5. The steering system according to claim 1, wherein:

the controller is configured to receive an accelerator signal relating to an action of an accelerator operation member for an accelerator operation that is provided in a vehicle, and a brake signal relating to an action of a brake operation member for a brake operation that is provided in the vehicle; and in the virtual mode, the controller is configured to set the operation reaction force based on the operation signal and the accelerator signal or based on the operation signal and the brake signal.

6. The steering system according to claim 5, wherein, in the virtual mode, the controller is configured to reduce the operation reaction force according to the accelerator signal corresponding to forward movement of the virtual mobile body.

7. The steering system according to claim 5, wherein, in the virtual mode, the controller is configured to increase the operation reaction force according to the brake signal during forward movement of the virtual mobile body.

8. The steering system according to claim 1, wherein, in the virtual mode, the controller is configured to supply the turning device with a corrected control current, obtained by adding an additional current value that increases and decreases at a predetermined frequency to the control current, such that the wheel turns left and right repeatedly regardless of the operation signal.

9. The steering system according to claim 8, wherein:

the controller is configured to receive an accelerator signal relating to an action of an accelerator operation member for an accelerator operation that is provided in a vehicle, and a brake signal relating to an action of a brake operation member for a brake operation that is provided in the vehicle; and in the virtual mode, the controller is configured to set the additional current value based on the accelerator signal or the brake signal.

10. The steering system according to claim 1, wherein, in the virtual mode, the controller is configured to reflect the predetermined oscillation component on the operation reaction force that has been set based on the operation signal.

11. The steering system according to claim 1, wherein, in the virtual mode, the controller is configured to set the control current to zero regardless of the operation signal.

12. A steering system of steer-by-wire type, comprising:

an operation device including an operation member for a steering operation by a user and a reaction force application device configured to apply an operation reaction force to the operation member;

a turning device mechanically cut off from the operation device and configured to turn a wheel according to a control current supplied; and a controller configured to control the turning device and the reaction force application device based on an operation signal relating to an action of the operation member received from the operation device, wherein:

the steering system is configured to switch between a normal mode of turning the wheel based on the operation signal and a virtual mode of steering a virtual mobile body, created as a video image, based on the operation signal;

the controller is configured to receive an accelerator signal relating to an action of an accelerator operation member for an accelerator operation that is provided in a vehicle, and a brake signal relating to an action of a brake operation member for a brake operation that is provided in the vehicle; and in the virtual mode, the controller is configured to set the control current to a current value at which the wheel does not turn regardless of the operation signal, and set the operation reaction force based on the operation signal and the accelerator signal or based on the operation signal and the brake signal.

13. The steering system according to claim 12, wherein, in the virtual mode, the controller is configured to reduce the operation reaction force according to the accelerator signal corresponding to forward movement of the virtual mobile body.

14. The steering system according to claim 12, wherein, in the virtual mode, the controller is configured to increase the operation reaction force according to the brake signal during forward movement of the virtual mobile body.

* * * * *